United States Patent
Cousins

(10) Patent No.: US 6,347,366 B1
(45) Date of Patent: Feb. 12, 2002

(54) SYSTEM AND METHOD FOR AUTOMATICALLY OPTIMIZING SOFTWARE PERFORMANCE

(75) Inventor: David B. Cousins, Barrington, RI (US)

(73) Assignees: Genuity Inc., Burlington, MA (US); GTE Services, Irving, TX (US)

( * ) Notice: Subject to any disclaimer, the term of this patent is extended or adjusted under 35 U.S.C. 154(b) by 0 days.

(21) Appl. No.: 09/209,152

(22) Filed: Dec. 10, 1998

(51) Int. Cl.[7] .............................................. G06F 12/00
(52) U.S. Cl. ........................... 711/170; 711/5; 711/156; 709/104; 709/105
(58) Field of Search .................................. 711/170, 171, 711/172, 5, 156, 119; 709/104, 105

(56) References Cited

U.S. PATENT DOCUMENTS

| | | |
|---|---|---|
| 5,319,781 A | 6/1994 | Syswerda |
| 5,586,285 A | * 12/1996 | Hasbun et al. ............. 711/103 |
| 5,682,328 A | 10/1997 | Roeber et al. |

OTHER PUBLICATIONS

D. Cousins et al., "Multiprocessor Event Collection and Analysis (MECA) System and Embedded Genetic Allocator (EGA) for Advanced Embedded Architectures," DARPA AO F277, pp. 1–35, Oct. 8, 1997.

"Multiprocessor Event Collection and Analysis System and Embedded Genetic Allocator for Advanced Embedded Architectures," Award/Contract, F30602–97–C–0296, Sep. 9, 1997.

"Multiprocessor Event Collection and Analysis System and Embedded Genetic Allocator for Advanced Embedded Architectures," Proposal Abstract, Dec. 1996.

"Multiprocessor Event Collection and Analysis (MECA) System and Embedded Genetic Allocator (EGA) for Advanced Embedded Architectures," Response to DARPA/ITO BAA 97–06, Feb. 7, 1997.

D. Cousins et al., "The Embedded Genetic Allocator—A System to Automatically Optimize the Use of Memory Resources in High Performance, Scalable Computing Systems," Conference Proceedings of the 1998 IEEE International Conference on Systems, Man and Cybernetics, Oct. 11–14, 1998.

* cited by examiner

Primary Examiner—Matthew Kim
Assistant Examiner—Matthew D. Anderson
(74) Attorney, Agent, or Firm—Leonard Charles Suchyta; James K. Weixel

(57) ABSTRACT

An embedded genetic allocator system uses genetic algorithms to generate trial solutions to the allocation of data buffers among various kinds of memory banks and measures the quality of each solution. The quality is determined through the use of a monitoring system that accurately measures application execution times while maintaining low intrusiveness in the software execution. Because the allocation process is highly automated and based upon accurate performance data derived from actual system operation, optimal solutions to the allocation problem are reached much more quickly and efficiently than can be done using current, largely manual, approaches.

51 Claims, 7 Drawing Sheets

SYSTEM AND METHOD FOR AUTOMATICALLY OPTIMIZING SOFTWARE PERFORMANCE

GOVERNMENT CONTRACTS

The present invention was made with government funds under AFRL Contract #F30602-97-C-0296 with DARPA ITO. The government may have certain rights in the invention.

BACKGROUND OF THE INVENTION

A. Field of the Invention

The present invention relates generally to optimizing memory allocation, and more particularly to using evolutionary algorithms to automatically optimize the memory allocation of a software application in a multiple memory architecture.

B. Description of the Related Art

Allocating application processing to various processors and memory banks in complex embedded multiprocessor systems to achieve optimum performance is an extremely difficult problem. When developing a real-time application on a multi-processor non-uniform memory access (NUMA) system, there are a number of factors that can affect application execution speed including processor types, memory types, concurrent utilization of memory and bus resources, and hierarchical interconnection schemes. These factors all affect application execution in ways that are both difficult to model and to predict. Even when these effects can be measured, it can be difficult for a programmer to use this information to minimize the combined effect of all the factors on execution time.

FIG. 1 shows an example of a multi-processor NUMA system 100, such as a VME based quad Texas Instruments C40 Digital Signal Processor (DSP) board manufactured by Mizar Inc. (Model MZ7772), on which an application may be run. System 100 includes a plurality of ALU processor cards 110 each having an ALU 112, a small and very fast on chip static RAM (SRAM) 114, a private, small and fast memory 116 and a shared, small and fast memory 118. A buffer 120 interconnects each of the cards 110 to a local bus 130. A large, slow shared memory 140, such as a global SRAM or hard disk drive, is coupled directly to local bus 130. System 100 also includes an asynchronous interface 150, which couples local bus 130 with a VME bus 160 to which a very large and slow memory 170 is connected.

As shown in FIG. 1, the memory hierarchy in system 100 includes four distinct banks of memory, each with different performance levels including small and very fast on chip SRAM 114, small but not as fast memories 116 and 118, large and slow shared memory 140, and very large slow globally shared memory 170. In an architecture such as system 100 in FIG. 1, the choices a programmer makes in selecting where data and intermediate results are stored can have a significant impact on program performance, often by an order of magnitude or more. DSPs can use, for example, the Harvard bus architecture, which has multiple buses that allow a CPU to retrieve data from two different memory banks in parallel. Furthermore, instructions are used that can fetch two pieces of data and perform a mathematical calculation all in one clock cycle.

In a simple implementation of a DSP algorithm, only one bank of memory is used for both the program code and data. This implementation exhibits poor performance due to excessive contention for the single memory bank. The situation can be exacerbated by the use of on-chip direct memory access (DMA) engines, which are commonly used to move input and output data between processors and I/O subsystems and can cause further contention on the various data buses available to the system.

Performance can be improved by separating data that is retrieved in parallel into different banks. Another option is to place the buffers that require the greatest amount of access into the fastest memory banks, although these fast memory banks may not be large enough to allow this allocation in some memory-restricted architectures. Thus, the buffer allocation problem can be viewed as a combination of an optimal packing problem and a contention reduction problem.

The manual approach to optimizing the data buffer allocation is commonly done by trying various placements of buffers to different memory banks and measuring the resulting execution time of the software. Many iterations are usually necessary to optimize performance. The difficulty of the problem rapidly increases with the number of buffers that need to be allocated. With many modem applications requiring hundreds of buffers, the manual approach is beyond what can be effectively solved by a programmer, requiring the use of sub-optimal techniques such as local optimization of key execution loops, rather than the entire program.

SUMMARY OF THE INVENTION

A method consistent with the present invention for optimizing the allocation of data buffers referenced by a software program among a plurality of memory banks in a target system generates randomly a population of trial allocations of the data buffers among the plurality of memory banks, determines a fitness score for each of the trial allocations, creates a new trial allocation based on at least one of the trial allocations in the existing population, repeats the determining and creating steps until the occurrence of a predetermined event, and identifies the trial allocation having the best fitness score.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments consistent with the invention and, together with the description, explain the advantages and principles of the invention. In the drawings.

DETAILED DESCRIPTION OF THE INVENTION

Figure 1:
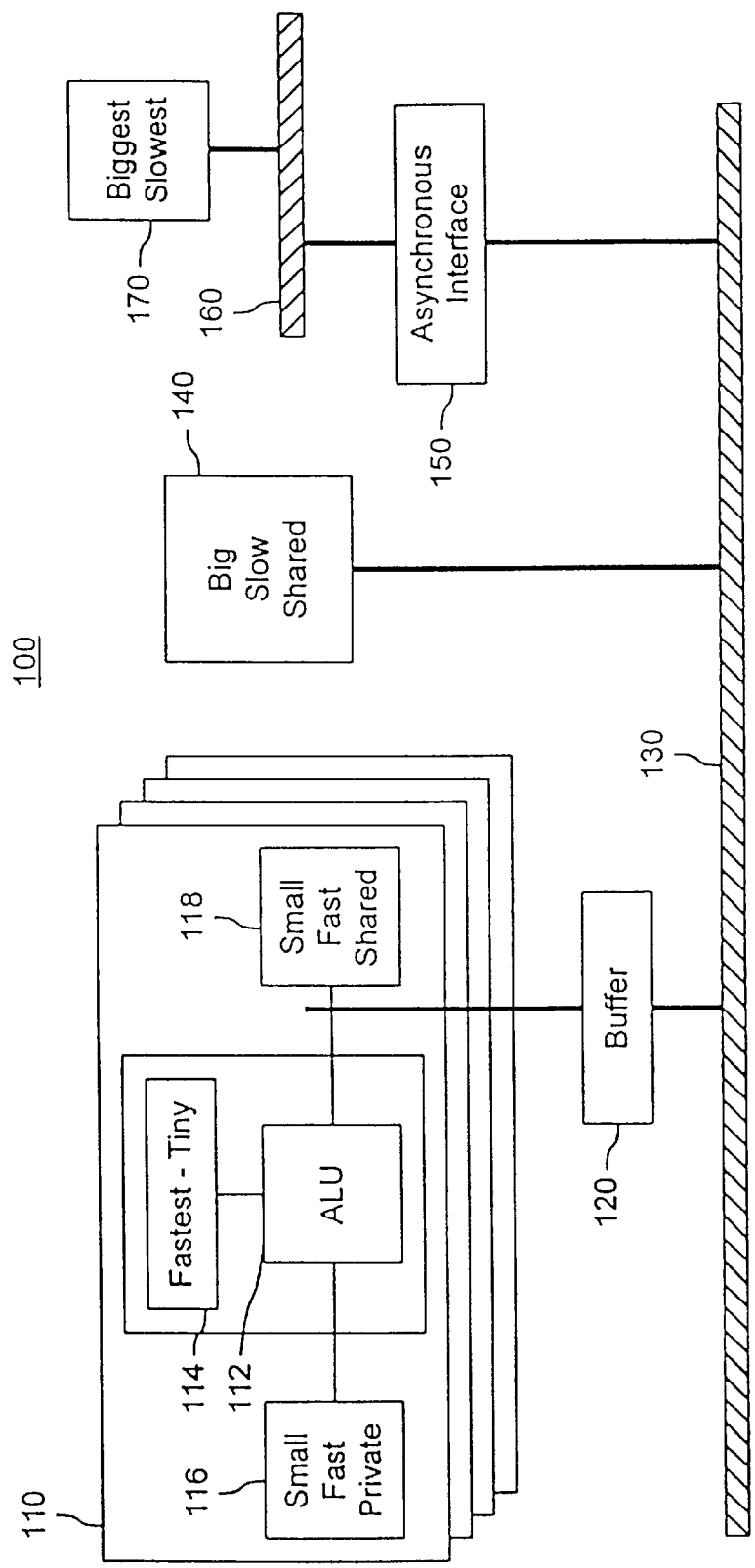
FIG. 1 is a block diagram of a conventional multi-processor non-uniform memory access system.

Reference will now be made to preferred embodiments of this invention, examples of which are shown in the accompanying drawings and will be obvious from the description of the invention. In the drawings, the same reference numbers represent the same or similar elements in the different drawings whenever possible.

An embedded genetic allocator (EGA) system consistent with the present invention manipulates a population of trial "system design blueprints," each representing an allocation of data buffers referenced in a software program among various memory banks in a target system. These trial blueprints are translated by the EGA into input files that are automatically loaded by the target system under optimization. Run-time event collection generates performance data that the EGA uses to score the trial allocation. A genetic algorithm (GA) is used to generate new trial blueprints based on the feedback provided by the performance evaluation.

Figure 2:
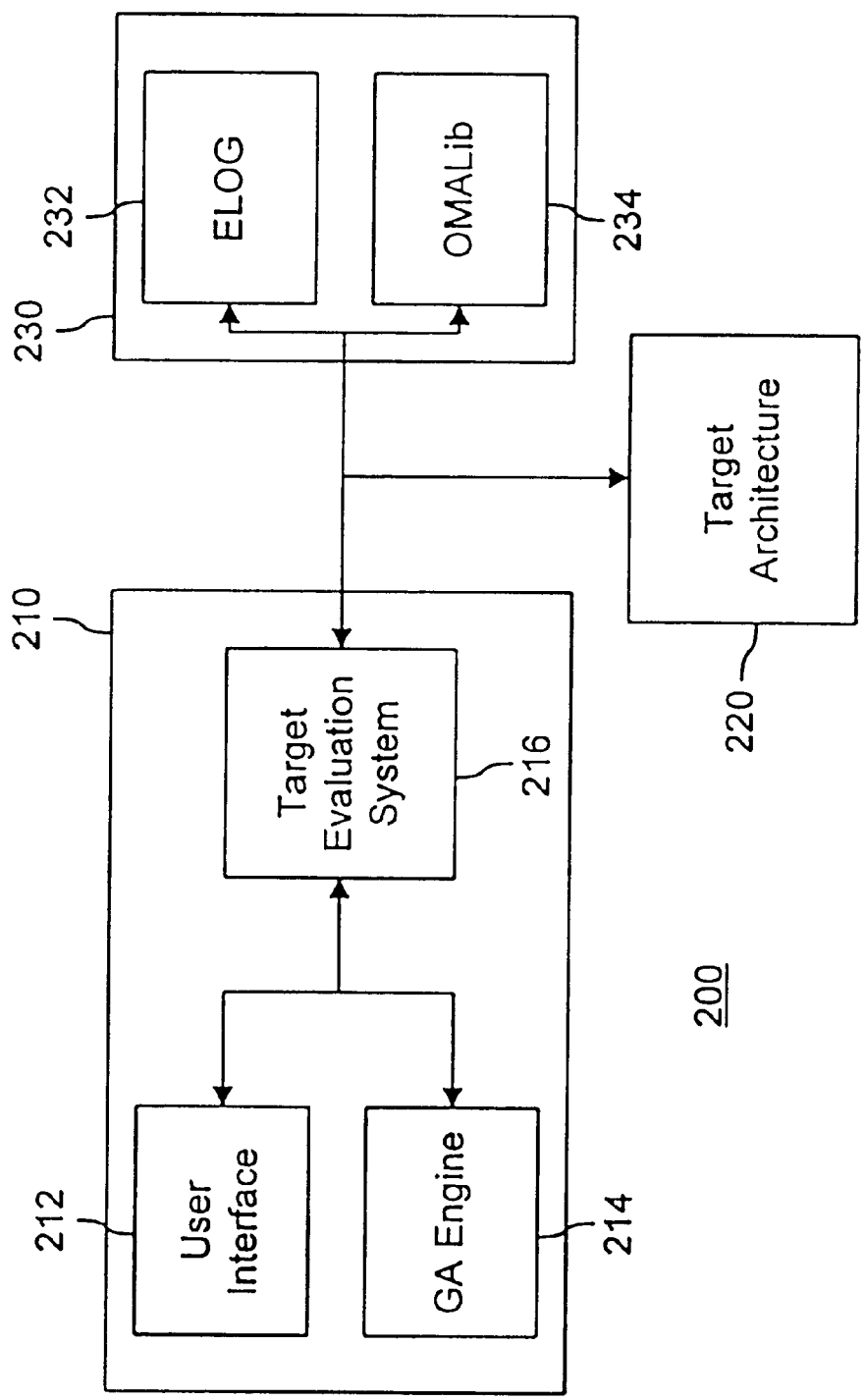
FIG. 2 is a block diagram of an embedded genetic allocator (EGA) consistent with the present invention.

FIG. 2 shows a diagram of an EGA system 200 consistent with the present invention. EGA system 200 consists of several software components. Two of these components are embedded in the software or target code 230 being optimized. The first is an online memory allocation library (OMALib) 234 that the programmer uses to identify the key data in target code 230. The second is an event logging library (ELOG) 232 that is used to instrument key portions of target code 230 for run-time performance monitoring. The remaining components of EGA system 200 run on a host workstation 210 connected to a target architecture 220. The first host component is a genetic algorithm (GA) engine 214, which generates the trial allocations. The second is a target evaluation system (TES) 216 that executes the trials on target architecture 220 and mediates communication between target architecture 220, GA engine 214, and the user via a graphical interface 212.

TES 216 can be implemented as a program that controls the target system processes and mediates communication between those processes and GA engine 214. GA engine 214 can be implemented as a program that creates trial allocation blueprints using GA techniques, which are described below in more detail. A graphical user interface (GUI) 212, which can be written in a language such as Tcl/Tk, enables the user to configure and run the system and monitor the status of an optimization run.

Figure 3:
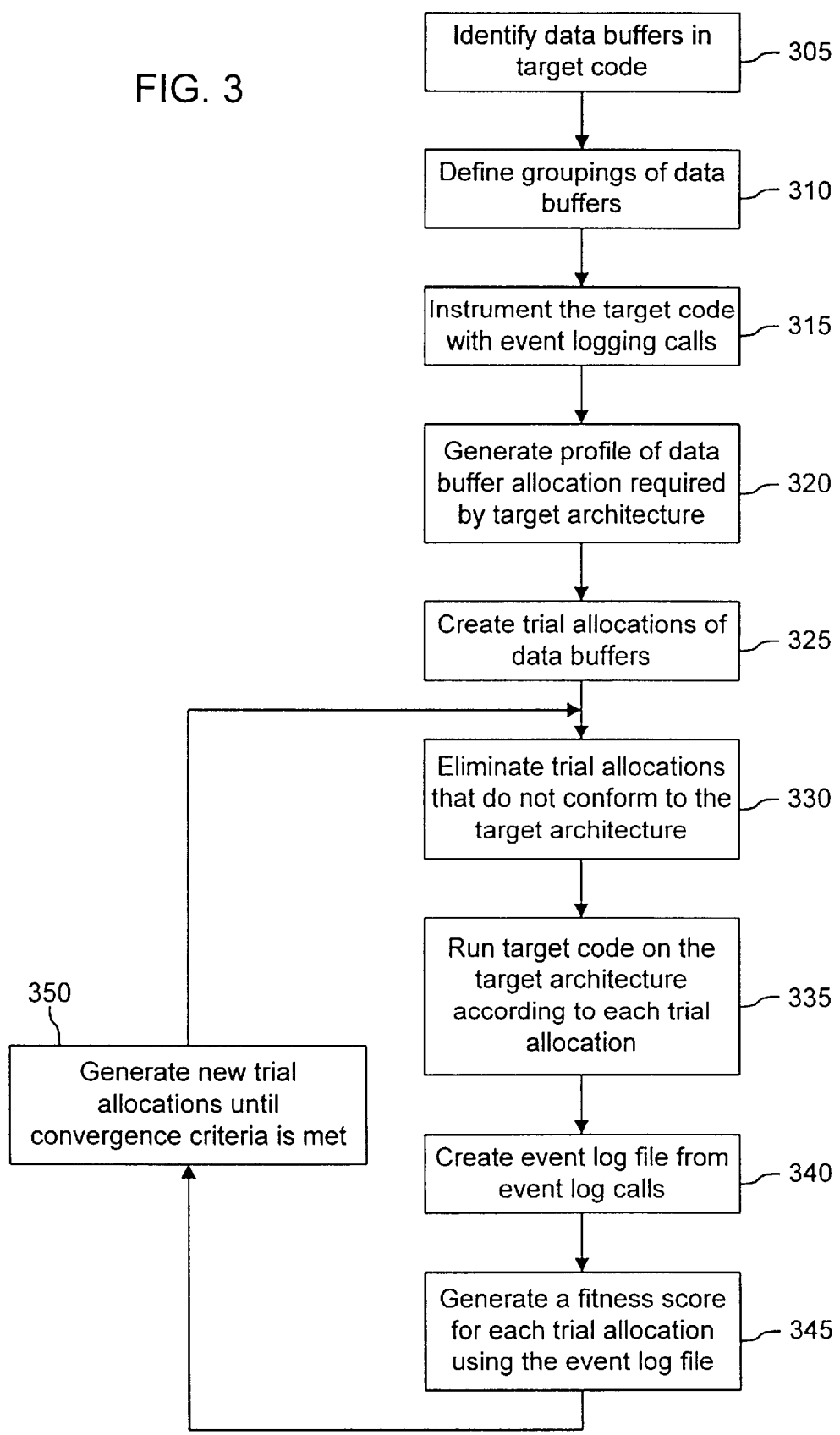
FIG. 3 is a flow diagram of a process for optimizing the allocation of a target code using the EGA of FIG. 2.

FIG. 3 shows a flow diagram of a process for optimizing the allocation of target code among various memory banks in a target system consistent with the present invention. First, the programmer manually identifies the key data components or data buffers of target code 230 through the use of calls to the OMALib 234 (step 305). This library is linked into the target code and acts like a smart "malloc" or memory allocation. It allows the user to identify the data buffers to be allocated and specify any restrictions of the allocation, such as that the buffer must be allocated in shared memory or aligned on an address boundary.

OMALib 234 also allows the user to define two types of groupings of the data buffers (step 310). These groupings provide two benefits: to reduce the dimensionality of the optimization search; and to provide equal quality of performance for certain related data buffers. The first type is called a process group. A process group defines a collection of software processes in the system that run the same executable code. All processes in a process group share the same data buffer allocation scheme. The second type of grouping is a buffer group. When buffers are allocated via an OMALib malloc call, they must be uniquely named. The naming convention supports a group name identifying the buffer as being a member of a buffer group. All the buffers in a group are then allocated as a single larger buffer by EGA system 200. For example, all the buffers in a ping-pong data buffer would be grouped together, as would all the history buffers in a bank of filters operating on multiple channels. Both processor and buffer groupings significantly reduce the number of discrete buffers to be allocated.

In addition to using OMALib 234, the user can instrument the target code with an event logging library (ELOG) 232 (step 315). The user brackets key portions of target code 230 with function calls that generate time-stamped events that are used to derive performance statistics about the software. The event logging can be performed, for example, with the use of an external monitoring system, such as TraceMaker™ (a product of BBN Corporation), which performs synchronized time-stamp management, off-loads all the event logging overhead from the target processors, and requires minimal overhead to log an event (<10 usec). The monitoring system gathers this event data and generates an event log file on host system 210. All the events produced by a given process are stored together in a trace. A more detailed description of the TraceMaker can be found in U.S. Pat. No. 5,682,328 to Frederick Roeber et al. entitled "Centralized Computer Event Data Logging System," which is assigned to BBN Corporation and is incorporated herein by reference.

Figure 4:
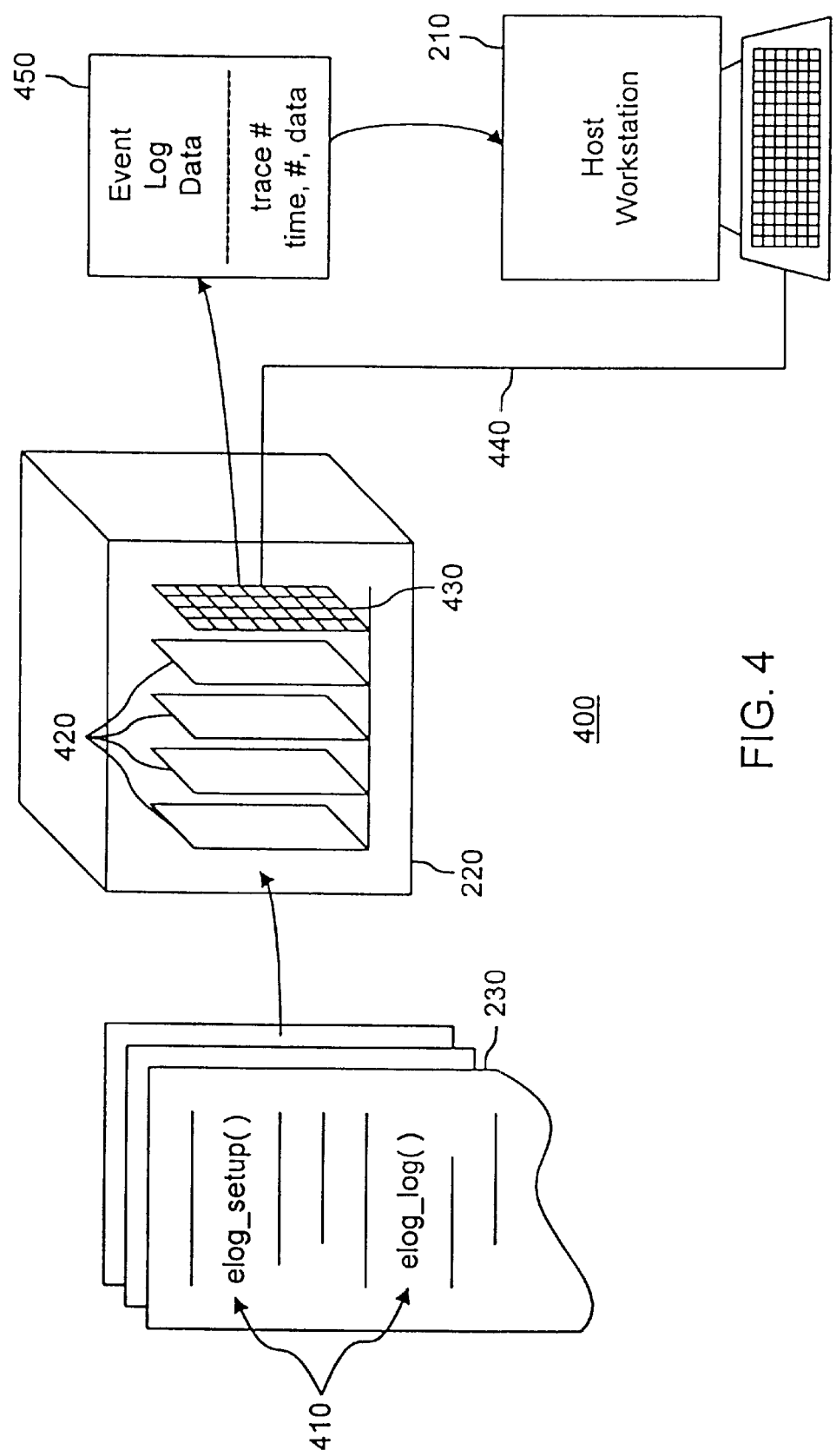
FIG. 4 is a block diagram of an event logging system consistent with the present invention.

FIG. 4 shows a block diagram of an event logging system 400 consistent with the present invention. As shown in FIG. 4, target code 230 is modified to include ELOG calls 410 for recording events. For example, a user can define states by denoting pairs of starting and stopping events for each state. States are used to measure the execution time of loops or function calls in the target code 230 under optimization. Target code 230 is then run on target architecture 220, which can include one or more application processors 420. Application processors 420 can be implemented, for example, as a multi-processor NUMA system such as shown in FIG. 1. In addition to application processors 420, target architecture 220 preferably includes an event logging board 430 for collecting and uploading event data to be stored in an event log 450. The user's program should preferably iterate over these functions enough times to generate meaningful statistics for the state durations. Using event logging board 430, event logging system 400 collects the traces generated by each application processor 420 and generates event log 450, which can be written to a disk on host computer 210 via a data connection 440, such as an Ethernet connection.

OMALib 234 runs in two modes. A first mode, which can be referred to as a configuration mode, is used to generate a profile of the data buffer allocation required by target architecture 220 (step 320). In this mode, each call to the OMALib malloc generates data that is used to define the system. In a second mode, referred to as a run mode, each malloc call looks up the appropriate allocation for each buffer from a table provided by GA engine 214.

Based on the profile of the data buffers to be allocated as generated by the configuration mode, GA engine 214 creates trial allocations (step 325). The initial population of trial allocations can be generated randomly by GA engine 214. A simple design rule check is performed to eliminate allocations that are invalid due to memory bank size restrictions (step 330). Allocations that fail this check receive a very poor score and are not tested on target architecture 220. If the trial passes, TES 216 runs target code 230 on target architecture 220 according to the trial allocation (step 335). OMALib 234 uses the trial's memory allocation scheme for the run, and ELOG 232 sends performance data to the event logging system, such as the TraceMaker (step 340). TES 216 monitors both target code 230 and the event logging system and notifies GA engine 214 upon run completion. GA engine 214 then uses the event logging system's event log file to generate a fitness score for that allocation (step 345).

In general, an optimization requires a single measure to be maximized or minimized. This value can be referred as both a cost function or a fitness score. In the case of EGA system 200, optimizing for maximum software performance can be achieved by minimizing the software's execution time as measured by the real-time event monitoring system. EGA system 200 can also be used to minimize the variance of the execution time, often referred to as reducing jitter, to minimize the cost of the memory used, or for fault tolerance by reconfiguring memory allocation to adapt to changes in hardware. These measurements can be used to derive a single fitness score for a trial allocation.

GA Engine 214 uses the event log to calculate the durations of the states in all the traces. It then calculates the overall fitness score of the run by combining the state timing information according to user specified criteria that determine which statistical and combinatorial operators are used for the calculations.

The timings for all the instances of a state within a single trace can be combined into a single state value by taking either the average, sum, minimum, maximum, or standard deviation of all the state durations in that trace. The resulting values for each of the states in a trace are then combined using one of the aforementioned operations to produce a single value for each trace. Finally, all the trace values are combined into a single fitness score in a similar way. Thus, state durations may be used to optimize for minimum execution time, minimum data transfer latency, etc.

Returning to FIG. 3, the whole process iterates as GA engine 214 generates new trials, until one of a convergence criteria is met (step 350). Among the criteria that may be specified by the user are: a target fitness score is achieved; a fixed number of iterations has elapsed; or the population has converged. The convergence of the population can be established when the fitness of the best allocation found so far has not changed by a specified percentage within a specified number of iterations. Other convergence criteria in addition to those described above can also be used.

The GA approach to optimization is based on automatically generating and evaluating different solutions to a problem in a controlled fashion until a solution satisfying the desired constraints is found. EGA system 200 produces and evaluates a trial memory allocation during each iteration of its GA. Once an initial population of randomly generated allocation schemes is created, the population having a fixed size established by the user, the GA produces new allocations schemes by either combining portions of two previously generated schemes (the crossover operation) or by randomly perturbing an existing scheme (the mutation operation). If the new memory allocation has a better evaluation than the worst scheme in the population, then the new scheme replaces the worst in the population.

Figure 5:
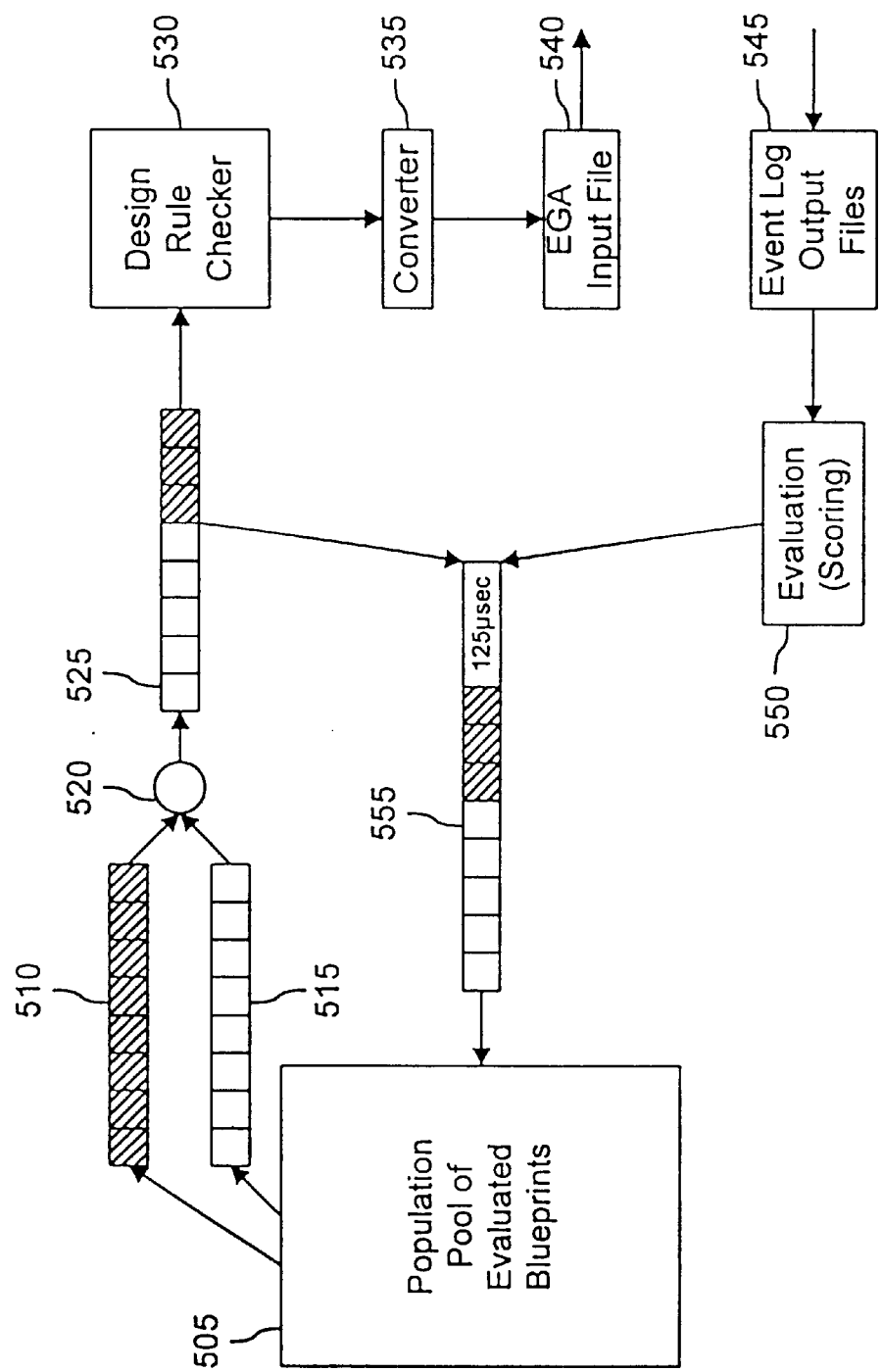
FIG. 5 is a block diagram of the operation of a crossover operation.

FIG. 5 shows a block diagram of the operation of the crossover operation. As shown in FIG. 5, two blueprints 510 and 515 are selected for the crossover operation from a pool of evaluated blueprints 505, which represent trial allocations of the data buffers of target code 230 in target architecture 220. The blueprints are generally selected based on the fitness or quality of its evaluation. A particular scheme for selecting blueprints is described below.

Parts of each of the selected blueprints 510 and 515 are then merged by crossover operator 520 to form a new blueprint 525. The new blueprint 525 is passed to a design rule checker 530, which determines whether the new blueprint 525 is invalid due to memory bank size restrictions in target architecture 220, as discussed above with respect to step 325 of FIG. 3. Assuming the new blueprint 525 satisfies the design rule, it is passed to a converter 535, which converts the blueprint to an EGA input file 540 that is passed to target architecture 220. EGA input file 540 is generated in a format understood by target architecture 220 for allocating the data buffers of target code 230 to the memory banks of target architecture 220.

EGA input file 540 is then run on target architecture 220 to evaluate its performance, and an event log output file 545 is generated. Event log output file 545 is then passed to GA engine 214 to generate an evaluation 550. Evaluation 550 is tied to new blueprint 525 to form a new evaluated blueprint 555, which is compared against the pool of evaluated blueprints 505. The new evaluated blueprint 555 replaces one of the existing evaluated blueprints if evaluation 550 is better than at least one of the existing evaluated blueprints.

Figure 6:
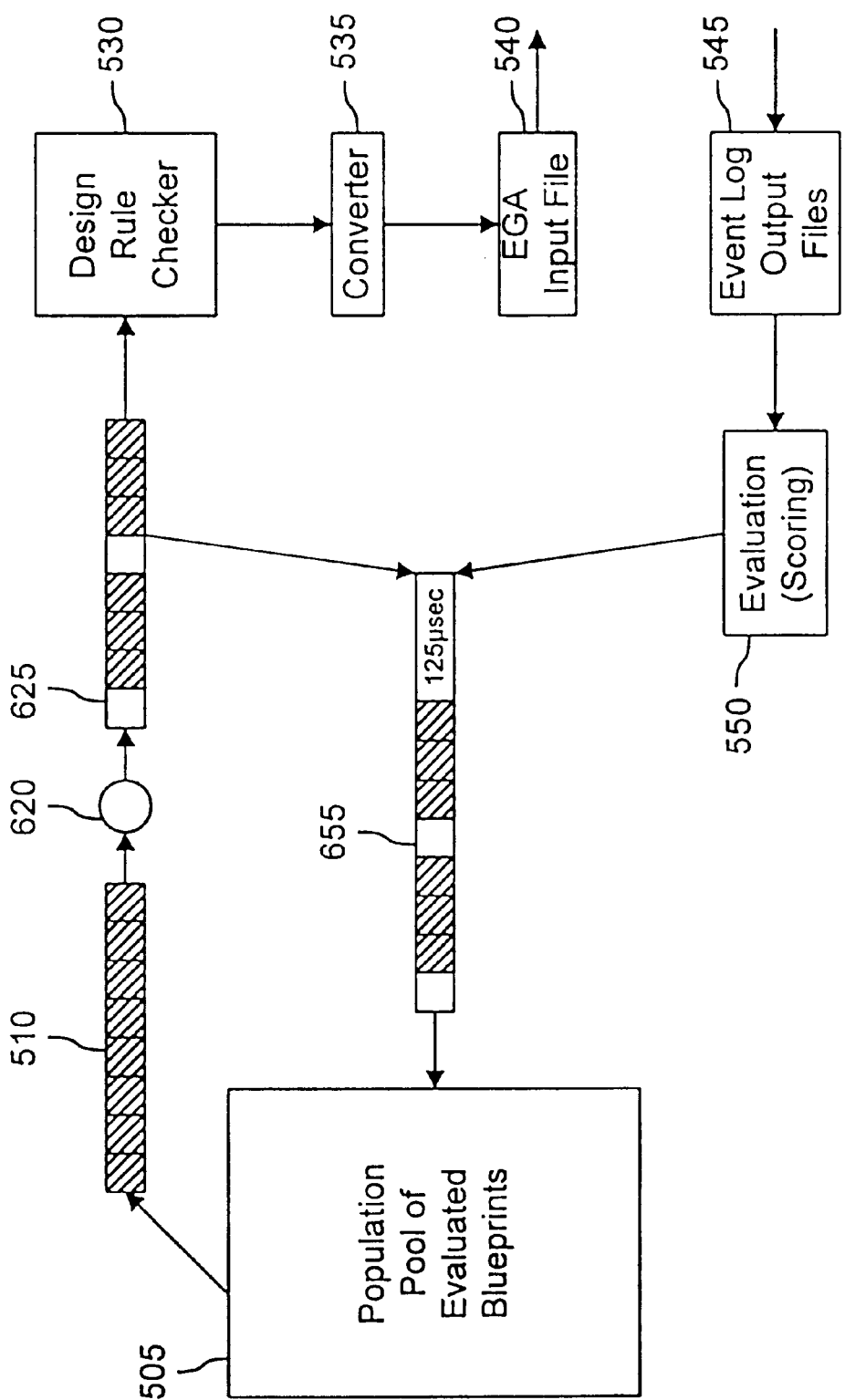
FIG. 6 is a block diagram of the operation of a mutation operation.

FIG. 6 shows a block diagram of the operation of the mutation operation. FIG. 6 is similar to FIG. 5 except that only one evaluated blueprint 510 is selected. Selected blueprint 510 is applied to mutation operator 620 to create a new blueprint 625. As shown in FIG. 6, the mutation operation serves to alter randomly one or more of the elements in selected blueprint 510. New blueprint 625 then passes through the same operations as new blueprint 525 discussed above until a new evaluated blueprint 655 is created and compared against the pool of evaluated blueprints 505. In creating new blueprints to evaluate using the GA method, both the crossover and mutation operations can be used concurrently. For example, a certain percentage of new blueprints can be created with the crossover operation and the remaining percentage can created with the mutation operation. These percentages can be fixed or varied over time in a manner established by the user.

EGA system 200 can be implemented using a Darwinian selection, where schemes in the population with better evaluations have a greater chance of being selected for crossover and mutation operations. This selective pressure helps drive the convergence of the population. The GA ranks N schemes in the population from most fit (n=0) to least fit (n=N−1). The probability, $P_n$, of a scheme being selected as a parent of the next trial depends on its ranking in the population, n, and is given by, $P_n = x^n[(1-x)/(1-x^N)]$, where x is called the parent scalar value (0<x<1). Each scheme is x times as likely to be a parent as the scheme ranked next higher in the population. The value of x is chosen so that there is some chance for the lower fitness schemes to be selected before the end of the optimization session; otherwise the population would become quickly dominated by the best individuals. EGA system 200 can use the heuristic for setting the parent scalar: $x = a^{1/p}$ where p is the population size, and a is the ratio of $P_{N-1}$ to $P_0$. For example, it has been found that setting a=1/20 has worked very well for population sizes of 100 to 800 members.

The trial solutions to the buffer allocation problem need to be encoded in a form that the GA can manipulate. This encoding is commonly referred to as a chromosome which gets manipulated by the crossover and mutation operations. EGA system 200 can be implemented using any of a variety of methods for encoding chromosomes. For example, with integer encoding, each element in an integer array corresponds to one of the buffers allocated by EGA system 200. The integer value of the element specifies the memory bank into which the buffer is allocated. This direct encoding offers good performance and a simple implementation.

Figure 7A:
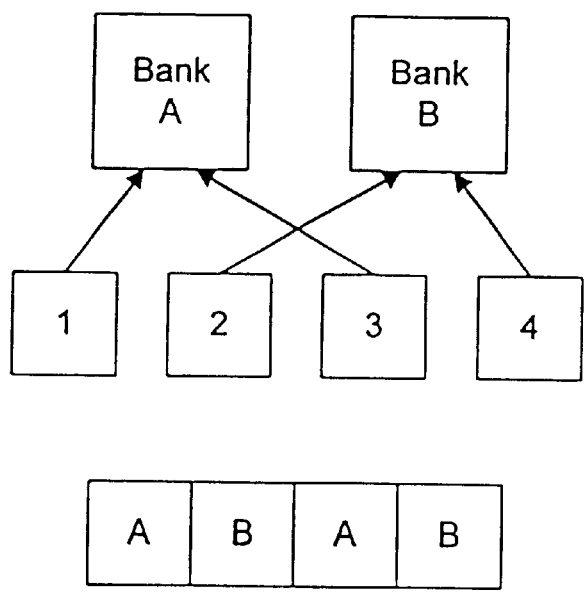
FIGS. 7A and 7B are block diagrams of an integer encoding and an order encoding, respectively.

FIG. 7A shows a diagram of an example of an integer encoding. As shown in FIG. 7A, data buffers 1 to 4 are allocated among two memory banks A and B. In particular, data buffers 1 and 3 are allocated to memory bank A and data buffers 2 and 4 are allocated to memory bank B. The chromosome lists the memory banks to which each data buffer is being allocated, e.g., data buffer 1 to memory bank A and so on to data buffer 4 to memory bank B.

Another possible encoding scheme, referred to as order encoding, more closely incorporates the heuristics used by a programmer during hand optimization. In this method, the buffers are numbered from 1 to N where N is the number of buffers to be allocated. Additionally, the integers N+1 to N+M−1, where M is the number of memory banks, are used as tokens to control the allocation algorithm. These numbers are placed in an arbitrary order, creating an ordered list.

A modified greedy algorithm can be used to convert the ordered list of buffer numbers into an allocation using the algorithm shown below.

Given an ordered vector C(1 to N+M−−1)
For I=1 to N+M−1{
if C(I)>N (i.e. is a bank token)
   disable further allocation to the best available bank
else
   allocate buffer C(I) into the best available bank that has enough space left to hold it
}

The bank tokens are required in order to allow the greedy algorithm to encode all possible allocation schemes. To see this, consider a simple case with only two buffers, both of which suffer contention with each other. Furthermore, let the fastest memory bank be large enough to store both buffers. The optimal allocation places these buffers in two different banks. If the algorithm did not have the ability to turn off allocation to the fastest bank, it would never find this optimal solution. Note that the algorithm will never turn off the last memory bank. The last bank is usually the slowest/largest available. The bank is guaranteed to be large enough to hold all the buffers because OMALib 234 places all the buffers in this bank when the target is first run in configuration mode.

Figure 7B:
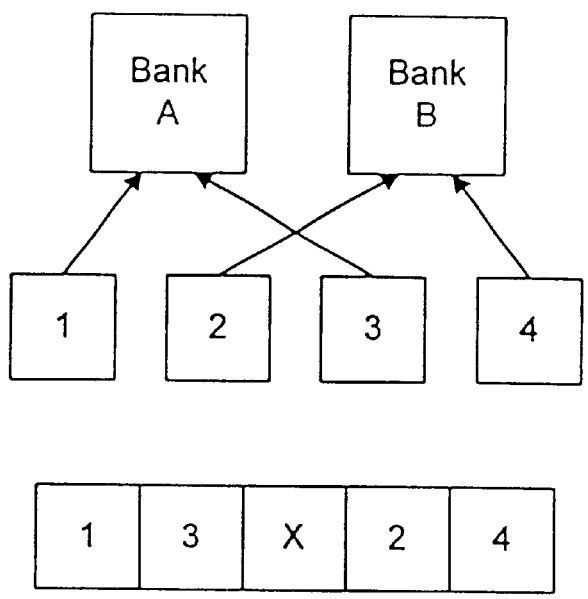

FIG. 7B shows a diagram of an example of an order encoding. The memory banks and data buffers are the same as those shown in FIG. 7A. The chromosome presents the data buffers in an order to be considered for allocation Each data buffer of the chromosome is then allocated to the fastest memory bank in which the data buffer fits. Accordingly, as shown in FIG. 7B, data buffers 1 and 3 are allocated to memory bank A, and data buffers 2 and 4 are allocated to memory bank B. X represent the token to disable further allocation to memory bank A.

To help maintain the population diversity and to prevent a single good chromosome from dominating the population, EGA system 200 preferably does not allow duplicate chromosomes in the population. In the case of ordered chromosomes, many chromosomes will encode the same allocation scheme since the order in which the buffers get placed in a bank does not effect program performance. To improve convergence performance, EGA system 200 is preferably implemented in a manner in which the population contains unique allocation schemes, eliminating multiple entries that result in the same allocation. This implementation offers a significant reduction in the problem space. For N buffers allocated into M banks, the integer encoding offers $N^M$ unique allocations whereas the ordered encoding provides (N+M−1)! unique ordered chromosomes. Since for large N, (N+M−1)! is much greater than $N^M$, the ordered encoding scheme generates more unique allocations. Results from experimental implementations have indicated that the ordered encoding method yields a faster convergence rate, achieving better scoring allocations in less time than the integer encoding method.

It will be apparent to those skilled in the art that various modifications and variations can be made without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A computer-implemented method for optimizing the allocation of data buffers referenced by a software program among a plurality of memory banks in a target system, comprising the steps of:

generating randomly a population of trial allocations of the data buffers among the plurality of memory banks;

determining a fitness score for each of the trial allocations;

creating a new trial allocation based on at least one of the trial allocations in the existing population;

repeating the determining and creating steps until the occurrence of a predetermined event; and identifying the trial allocation having the best fitness score.

2. The method according to claim 1, wherein the determining step includes the substep of allocating the data buffers to the plurality of memory banks according to each of the trial allocations.

3. The method according to claim 1, further comprising the step of:

defining each of the data buffers referenced by the software program.

4. The method according to claim 3, wherein the defining step includes the substep of including data buffers that require the same quality of service in a single group such that data buffers in the single group are allocated to the same memory bank.

5. The method according to claim 3, wherein the defining step includes the substep of including data buffers that are used by at least two processors in the target system in a single group such that data buffers in the single group are allocated to the same memory bank.

6. The method according to claim 1, wherein the repeating step includes the substep of repeating the determining and creating steps for a predetermined number of iterations.

7. The method according to claim 1, wherein the repeating step includes the substep of repeating the determining and creating steps until the determined fitness score of one of the trial allocations reaches a specified target score.

8. The method according to claim 1, wherein the repeating step includes the substep of repeating the determining and creating steps until the fitness score of one of the trial allocations is the best score for a predetermined number of iterations.

9. The method according to claim 1, further comprising the step of:

adding the new trial allocation to the existing population of trial allocations if the fitness score of the new trial allocation is better than at least one of the trial allocations in the existing population.

10. The method according to claim 9, wherein the adding step includes the substep of removing a trial allocation from the existing population having a fitness score worse than the fitness score of the new trial allocation.

11. The method according to claim 1, wherein the creating step includes the substep of changing at least one data buffer allocation of a trial allocation in the existing population to create the new trial allocation.

12. The method according to claim 1, wherein the creating step includes the substep of merging the data buffer allocations of two trial allocations in the existing population to create the new trial allocation.

13. The method according to claim 1, wherein the creating step includes the substep of selecting the at least one of the trial allocations in the existing population based on its fitness score.

14. The method according to claim 1, wherein the generating step includes the substep of representing each trial allocation as an array of elements, each element of the array representing one of the data buffers, and the value of each element controlling to which memory bank that data buffer is being allocated.

15. The method according to claim 1, wherein the determining step includes the substeps of:
instrumenting event calls in the software program;
running the software program on the target system;
to logging each of the event calls made during the running of the software program;
calculating an execution time of the software program based on the logged event calls; and
establishing the fitness score based on the calculated execution time.

16. The method according to claim 1, wherein the generating step includes the substep of conforming the trial allocations according to the size of the memory banks.

17. The method according to claim 1, wherein the plurality of memory banks include at least two memory banks having different speeds.

18. A computer system for optimizing the allocation of data buffers referenced by a software program among a plurality of memory banks in a target system, comprising:
a memory having program instructions; and
a processor configured to use the program instructions to generate a random population of trial allocations of the data buffers among the plurality of memory banks; to determine a fitness score for each of the trial allocations; to create a new trial allocation based on at least one of the trial allocations in the existing population; to repeat the determining and creating instructions until the occurrence of a predetermined event; and to identify the trial allocation having the best fitness score.

19. The computer system according to claim 18, wherein the determining instruction includes the subinstruction to allocate the data buffers to the plurality of memory banks according to each of the trial allocations.

20. The computer system according to claim 18, wherein the processor is further configured to use the program instructions to define each of the data buffers referenced by the software program.

21. The computer system according to claim 20, wherein the defining instruction includes the subinstruction to include data buffers that require the same quality of service in a single group such that data buffers in the single group are allocated to the same memory bank.

22. The computer system according to claim 20, wherein the defining instruction includes the subinstruction to include data buffers that are used by at least two processors in the target system in a single group such that data buffers in the single group are allocated to the same memory bank.

23. The computer system according to claim 18, wherein the repeating instruction includes the subinstruction to repeat the determining and creating steps for a predetermined number of iterations.

24. The computer system according to claim 18, wherein the repeating instruction includes the subinstruction to repeat the determining and creating steps until the determined fitness score of one of the trial allocations reaches a specified target score.

25. The computer system according to claim 18, wherein the repeating instruction includes the subinstruction to repeat the determining and creating steps until the fitness score of one of the trial allocations is the best score for a predetermined number of iterations.

26. The computer system according to claim 18, wherein the processor is further configured to use the program instructions to add the new trial allocation to the existing population of trial allocations if the fitness score of the new trial allocation is better than at least one of the trial allocations in the existing population.

27. The computer system according to claim 26, wherein the adding instruction includes the subinstruction to remove a trial allocation from the existing population having a fitness score worse than the fitness score of the new trial allocation.

28. The computer system according to claim 18, wherein the creating instruction includes the subinstruction to change at least one data buffer allocation of a trial allocation in the existing population to create the new trial allocation.

29. The computer system according to claim 18, wherein the creating instruction includes the subinstruction to merge the data buffer allocations of two trial allocations in the existing population to create the new trial allocation.

30. The computer system according to claim 18, wherein the creating instruction includes the subinstruction to select the at least one of the trial allocations in the existing population based on its fitness score.

31. The computer system according to claim 18, wherein the generating instruction includes the subinstruction to represent each trial allocation as an array of elements, each element of the array representing one of the data buffers, and the value of each element controlling to which memory bank that data buffer is being allocated.

32. The computer system according to claim 18, wherein the determining instruction includes the subinstructions to:
instrument event calls in the software program;
run the software program on the target system;
log each of the event calls made during the running of the software program;
calculate an execution time of the software program based on the logged event calls; and
establish the fitness score based on the calculated execution time.

33. The computer system according to claim 18, wherein the generating instruction includes the subinstruction to conform the trial allocations according to the size of the memory banks.

34. The computer system according to claim 18, wherein the plurality of memory banks include at least two memory banks having different speeds.

35. A system for optimizing the allocation of data buffers referenced by a software program among a plurality of memory banks in a target system, comprising:

means for generating randomly a population of trial allocations of the data buffers among the plurality of memory banks;

means for determining a fitness score for each of the trial allocations;

means for creating a new trial allocation based on at least one of the trial allocations in the existing population;

means for repeating the execution of the means for determining and means for creating until the occurrence of a predetermined event; and means for identifying the trial allocation having the best fitness score.

36. The system according to claim 35, wherein the means for determining includes means for allocating the data buffers to the plurality of memory banks according to each of the trial allocations.

37. The system according to claim 35, further comprising:

means for defining each of the data buffers referenced by the software program.

38. The system according to claim 37, wherein the means for defining includes means for including data buffers that require the same quality of service in a single group such that data buffers in the single group are allocated to the same memory bank.

39. The system according to claim 37, wherein the means for defining includes means for including data buffers that are used by at least two processors in the target system in a single group such that data buffers in the single group are allocated to the same memory bank.

40. The system according to claim 35, wherein the means for repeating includes means for repeating the execution of the means for determining and means for creating for a predetermined number of iterations.

41. The system according to claim 35, wherein the means for repeating includes means for repeating the execution of the means for determining and means for creating until the determined fitness score of one of the trial allocations reaches a specified target score.

42. The system according to claim 35, wherein the means for repeating includes means for repeating the execution of the means for determining and means for creating until the fitness score of one of the trial allocations is the best score for a predetermined number of iterations.

43. The system according to claim 35, further comprising:

means for adding the new trial allocation to the existing population of trial allocations if the fitness score of the new trial allocation is better than at least one of the trial allocations in the existing population.

44. The system according to claim 43, wherein the means for adding includes means for removing a trial allocation from the existing population having a fitness score worse than the fitness score of the new trial allocation.

45. The system according to claim 35, wherein the means for creating includes means for changing at least one data buffer allocation of a trial allocation in the existing population to create the new trial allocation.

46. The system according to claim 35, wherein the means for creating includes means for merging the data buffer allocations of two trial allocations in the existing population to create the new trial allocation.

47. The system according to claim 35, wherein the means for creating includes means for selecting the at least one of the trial allocations in the existing population based on its fitness score.

48. The system according to claim 35, wherein the means for generating includes means for representing each trial allocation as an array of elements, each element of the array representing one of the data buffers, and the value of each element controlling to which memory bank that data buffer is being allocated.

49. The system according to claim 35, wherein the means for determining includes:

means for instrumenting event calls in the software program;

means for running the software program on the target system;

means for logging each of the event calls made during the running of the software program;

means for calculating an execution time of the software program based on the logged event calls; and means for establishing the fitness score based on the calculated execution time.

50. The system according to claim 35, wherein the means for generating includes means for conforming the trial allocations according to the size of the memory banks.

51. The system according to claim 35, wherein the plurality of memory banks include at least two memory banks having different speeds.

* * * * *

UNITED STATES PATENT AND TRADEMARK OFFICE
CERTIFICATE OF CORRECTION

PATENT NO. : 6,347,366 B1  Page 1 of 1
DATED : February 12, 2002
INVENTOR(S) : David B. Cousins It is certified that error appears in the above-identified patent and that said Letters Patent is hereby corrected as shown below:

<u>Title page,</u>
Item [19], replace "Cousins" with -- Cousins et al. --

Item [75], Inventors, replace "David B. Cousins, Barrington, RI (US)" with -- David B. Cousins, Barrington, RI (US); Robert G. Elmer, Portsmouth, RI (US) --

Signed and Sealed this

Thirteenth Day of August, 2002

*Attest:*

JAMES E. ROGAN
*Attesting Officer* *Director of the United States Patent and Trademark Office*

UNITED STATES PATENT AND TRADEMARK OFFICE
CERTIFICATE OF CORRECTION

PATENT NO.     : 6,347,366 B1
DATED          : February 12, 2002
INVENTOR(S)    : David B. Cousins et al.

Page 1 of 1

It is certified that error appears in the above-identified patent and that said Letters Patent is hereby corrected as shown below:

<u>Title page,</u>
Item [73], replace "Genuity Inc., Burlington, MA (US);
GTE Services, Irving, TX (US)" with
-- Genuity Inc., Burlington, MA (US);
GTE Service Corporation, Irving, TX (US) --

Signed and Sealed this

Twenty-fourth Day of December, 2002

JAMES E. ROGAN
*Director of the United States Patent and Trademark Office*